US008578373B1

(12) United States Patent
Krishnan et al.

(10) Patent No.: US 8,578,373 B1
(45) Date of Patent: Nov. 5, 2013

(54) TECHNIQUES FOR IMPROVING PERFORMANCE OF A SHARED STORAGE BY IDENTIFYING TRANSFERRABLE MEMORY STRUCTURE AND REDUCING THE NEED FOR PERFORMING STORAGE INPUT/OUTPUT CALLS

(75) Inventors: Sasidharan Krishnan, Sunnyvale, CA (US); Suhas Girish Urkude, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 1027 days.

(21) Appl. No.: 12/134,783

(22) Filed: Jun. 6, 2008

(51) Int. Cl.
 *G06F 9/455* (2006.01)
 *G06F 13/00* (2006.01)

(52) U.S. Cl.
 USPC ............... 718/1; 711/100; 711/153; 711/160; 711/173

(58) Field of Classification Search
 USPC .............. 718/1; 711/164, 173, E12.095, 100, 711/153, 160
 See application file for complete search history.

(56) References Cited

U.S. PATENT DOCUMENTS

| 6,854,115 | B1 * | 2/2005 | Traversat et al. ................. 718/1 |
| 7,039,661 | B1 * | 5/2006 | Ranade ................... 707/999.202 |
| 7,213,246 | B1 * | 5/2007 | van Rietschote et al. ......... 718/1 |
| 7,386,664 | B1 * | 6/2008 | Roy et al. ...................... 711/114 |
| 7,647,463 | B2 * | 1/2010 | Jarvis et al. .................... 711/162 |
| 7,925,850 | B1 * | 4/2011 | Waldspurger et al. ......... 711/162 |
| 8,392,370 | B1 * | 3/2013 | Whitney et al. ............... 707/640 |
| 2003/0018927 | A1 * | 1/2003 | Gadir et al. ........................ 714/4 |
| 2004/0139237 | A1 * | 7/2004 | Rangan et al. ..................... 710/1 |
| 2005/0198062 | A1 * | 9/2005 | Shapiro ........................... 707/102 |
| 2005/0210074 | A1 * | 9/2005 | Nakatani et al. ............... 707/200 |
| 2005/0283658 | A1 * | 12/2005 | Clark et al. ....................... 714/11 |
| 2006/0085792 | A1 * | 4/2006 | Traut ............................... 718/100 |
| 2007/0180436 | A1 * | 8/2007 | Travostino et al. ............ 717/138 |
| 2007/0220121 | A1 * | 9/2007 | Suwarna ........................ 709/220 |
| 2007/0239944 | A1 * | 10/2007 | Rupanagunta et al. ........ 711/147 |
| 2008/0127182 | A1 * | 5/2008 | Newport et al. ................... 718/1 |
| 2008/0133963 | A1 * | 6/2008 | Katano et al. ...................... 714/4 |
| 2008/0189700 | A1 * | 8/2008 | Schmidt et al. .................... 718/1 |
| 2009/0083490 | A1 * | 3/2009 | Berger et al. .................. 711/130 |

OTHER PUBLICATIONS

Liu et al., ESS: A New Storage Architecture for Mid/Large RAID, Aug. 13-16, 2006, IEEE, Proceedings of the Fift International Conference on Machine Learning and Cybernatics, pp. 940-947.*
Clark et al., Live Migration of Virtual Machines, 2005, USENIX, 2nd Symposium on Networked System Design & Implementation, pp. 273-286.*
Wei et al., A Case for High Performance Computing with Virtual Machines, Jun. 28-30, 2006, ACM, ICS'06, pp. 125-134.*
Yingwei et al., A Three Phase Algorithm for Whole System Live Migration of Virtual Machines, Nov. 11, 2007, ACM, Asian Technology Information Program (AITP) 3rd China HPC Workshop SC07 Conference, pp. 172-173.*

* cited by examiner

*Primary Examiner* — Meng An
*Assistant Examiner* — Abu Ghaffari
(74) *Attorney, Agent, or Firm* — Wilmer Cutler Pickering Hale and Dorr LLP

(57) ABSTRACT

Techniques for improving performance of a shared storage environment are disclosed. In one particular exemplary embodiment, the techniques may be realized as a method for improving performance of a shared storage environment comprising determining a unit of shared storage utilized by an environment to be migrated, retrieving a storage management memory structure of a source computing platform for the unit of the shared storage, transferring the storage management memory structure to a target computing platform, and building a portion of storage management memory for the target computing platform utilizing the transferred storage management memory structure.

18 Claims, 3 Drawing Sheets

TECHNIQUES FOR IMPROVING PERFORMANCE OF A SHARED STORAGE BY IDENTIFYING TRANSFERRABLE MEMORY STRUCTURE AND REDUCING THE NEED FOR PERFORMING STORAGE INPUT/OUTPUT CALLS

FIELD OF THE DISCLOSURE

The present disclosure relates generally to shared storage environments and, more particularly, to techniques for improving performance of a shared storage environment.

BACKGROUND OF THE DISCLOSURE

In many environments, applications, virtual machines, and other computing clients may utilize data redundancy and a highly available computing environment. Shared storage environments may enable multiple computing platforms to access data contained on shared storage. This may facilitate the migration of environments from one computing platform to a second. Mirrored storage environments may provide data redundancy. Computing platforms utilizing mirrored storage environments may utilize techniques to improve performance of mirrored storage. For example, dirty region logging may be utilized.

Dirty region logging may be utilized to logically divide a unit of storage, such as a volume, into one or more portions or regions. Dirty region logging may then maintain indicators which specify one or more portions or regions that have been written to, or are "dirty". While writes to mirrored storage may occur in parallel, a system crash may occur when writes to a unit of storage have completed but writes to a mirrored unit of storage have not completed. If a system crash occurs without dirty region logging, recovery of mirrored storage may require recovery of an entire unit of storage. Dirty region logging may enable the recovery of only the one or more portions or regions of a unit of storage whose indicators correspond to a dirty state.

Dirty region logging (DRL) is merely one storage management technique that may be utilized to improve performance in an environment utilizing mirrored storage. Dirty region logging may maintain indicators written to the mirrored storage itself. However, an environment utilizing dirty region logging may also maintain dirty region logging information in memory to minimize required disk input/output (I/O).

Dirty region logging information maintained in memory may improve performance in an environment utilizing mirrored storage, even during normal operations when recovery is not necessary. For example, if multiple writes occur to a single region or portion of a unit of storage, an indicator for that portion may only need to be set once. If a process is writing data to a portion which has previously been marked as dirty, the process may verify that the indicator is set in memory and may skip a disk read to verify that the dirty indicator is set for that portion and/or a disk write to set the dirty indicator for that portion.

A second example of storage management memory structures may be caching algorithms and/or data associated with caching algorithms. Caching algorithms may determine which portions of storage should be stored in memory. For example, a least recently used caching algorithm may "age out" data in memory that has not been recently requested by a process. Aging out data may mean that it is written to disk and flushed from memory to free memory space for data that has been more recently used. Caching algorithms may be used for a variety of storage management issues including determining which portion of a dirty region log to maintain in memory.

In environments requiring high availability, multiple computing platforms may be communicatively coupled to shared storage and/or the storage may be shared between multiple computing platforms. This may enable a secondary host to support a computing environment on a primary host. The secondary host may enable the continued processing of a computing environment migrated from a primary host to the secondary host. The migration may occur due to a problem on a first computing platform, for load balancing reasons, for scheduled maintenance, or for other reasons. Applications, virtual machines, or other computing environments may experience performance degradation due to the lack of storage management memory structures after migration to the target computing platform. Building one or more storage management memory structures may require significant storage input/output, processing, and other resource utilization. Thus, the overhead of building storage management memory structures on a target computing platform may further degrade performance.

In view of the foregoing, it may be understood that there are significant problems and shortcomings associated with current technologies enabling migrated environments utilizing mirrored storage.

SUMMARY OF THE DISCLOSURE

Techniques for improving performance of a shared storage environment are disclosed. In one particular exemplary embodiment, the techniques may be realized as a method for improving performance of a shared storage environment comprising determining a unit of shared storage utilized by an environment to be migrated, retrieving a storage management memory structure of a source computing platform for the unit of the shared storage, transferring the storage management memory structure to a target computing platform, and building a portion of storage management memory for the target computing platform utilizing the transferred storage management memory structure.

In another particular exemplary embodiment, the techniques may be realized as an article of manufacture for improving performance of a shared storage environment. The article of manufacture may comprise at least one processor readable medium, and instructions carried on the at least one medium, wherein the instructions are configured to be readable from the at least one medium by at least one processor and thereby cause the at least one processor to operate so as to determine a unit of shared storage utilized by an environment to be migrated, retrieve a storage management memory structure of a source computing platform for the unit of the shared storage, transfer the storage management memory structure to a target computing platform, and build a portion of storage management memory for the target computing platform utilizing the transferred storage management memory structure.

In still another particular exemplary embodiment, the techniques may be realized as a system for improving performance of a shared storage environment, comprising one or more processors communicatively coupled to a network, wherein the one or more processors are configured to determine a unit of shared storage utilized by an environment to be migrated, retrieve a storage management memory structure of a source computing platform for the unit of the shared storage, transfer the storage management memory structure to a target computing platform, and build a portion of storage management memory for the target computing platform utilizing the transferred storage management memory structure.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
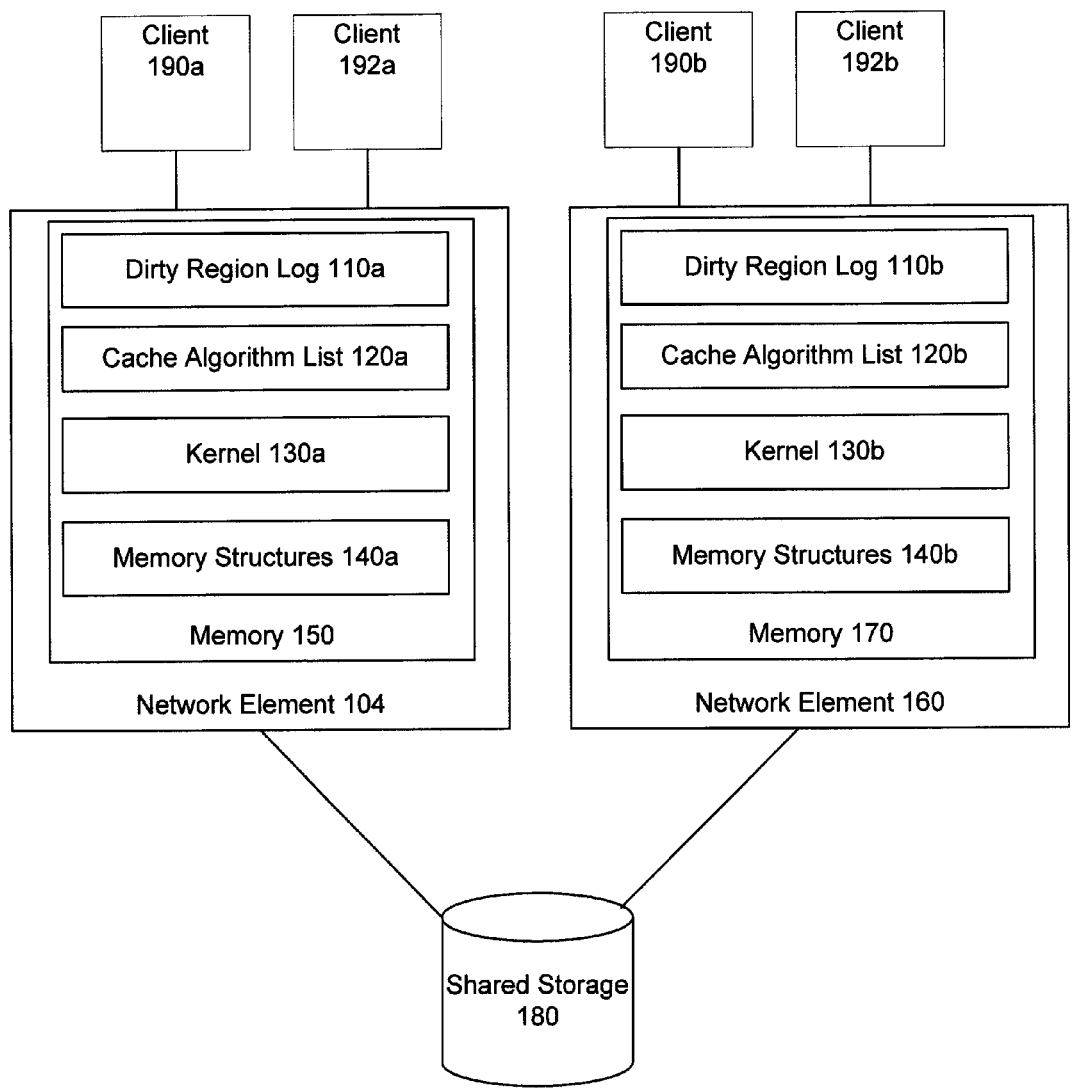
FIG. 1 shows a system for improving performance of a shared storage environment in accordance with an embodiment of the present disclosure.

Referring to FIG. 1, there is shown a system 100 for improving performance of a shared storage environment in accordance with an embodiment of the present disclosure. FIG. 1 is a simplified view of system 100, which may include additional elements that are not depicted. Network elements 104 and 160 may be communicatively coupled to shared storage 180. Network element 104 may contain memory 150. Memory 150 may contain dirty region log 110a, cache algorithm list 120a, kernel 130a, and memory structures 140a. Clients 190a and 192a may represent virtual clients, applications, physical clients, or other users of network element 104. Network element 160 may contain memory 170. Memory 170 may contain dirty region log 110b, cache algorithm list 120b, kernel 130b, and memory structures 140b. Clients 190b and 192b may represent virtual clients, applications, physical clients, or other users of network element 160.

Network elements 104 and 160 may be application servers, backup servers, network storage devices, or other devices communicatively coupled to a network. Network elements 104 and 160 may utilize shared storage 180 for the storage of application data, backup data, or other data.

Shared storage 180 may be local, remote, or a combination thereof to network elements 104 and 160. Shared storage 180 may utilize a redundant array of inexpensive disks (RAID), striped disks, hot spare disks, tape, disk, or other computer accessible storage. In one or more embodiments shared storage 180 may be a storage area network (SAN), an internet small computer systems interface (iSCSI) SAN, a Fibre Channel SAN, a common Internet File System (CIFS), network attached storage (NAS), or a network file system (NFS). In some embodiments, shared storage 180 may be volumes or other storage which may be exported as logical unit numbers (LUNs) utilizing storage management software to one or more clients and/or environments.

Memory 150 and 170 may represent random access memory or other electronic storage utilized by network elements 104 and 160.

Dirty region logs 110a and 110b may represent portions of memory utilized for storing one or more portions of a dirty region log in memory. Dirty region logs 110a and 110b may be utilized to indicate which portions of shared storage 180 have been written to.

Cache algorithm lists 120a and 120b may be lists utilized by cache algorithms to manage which portion of shared storage 180 are maintained in memory 150 and memory 170, respectively. Shared storage 180 may contain mirrored storage and cache algorithm lists 120a and 120b may contain data indicating which portion of a dirty region log should be in memory. Cache algorithms may include least recently used (LRU), least frequently used (LFU), adaptive replacement cache (ARC), most frequently used (MFU), or other algorithms.

Kernels 130a and 130b may be operating system kernels, such as Linux kernels utilized by one or more virtual environments.

Memory structures 140a and 140b may be memory structures utilized by clients 190a, 192a, 190b, and 192b. Memory structures 140a and 140b may include operating system cached information that may improve performance of one or more clients of network elements 104 and 160.

Clients 190a and 192a may be virtual clients, applications, physical clients, or other users of network element 104. Clients 190b and 192b may be virtual clients, applications, physical clients, or other users of network element 160. In one or more embodiments, network element 104 may be a primary host and network element 160 may be a secondary host. Clients 190a and 192a may represent clients prior to migration from network element 104 to network element 160. Clients 190b and 192b may be the same clients after migration to network element 160. Similarly, dirty region log 110a, cache algorithm list 120a, kernel 130a, and memory structures 140a may represent memory structures utilized by clients 190a and 192a prior to migration, and dirty region log 110b, cache algorithm list 120b, kernel 130b, and memory structures 140b may represent memory structures utilized by clients 190b and 192b after migration.

In some embodiments, clients 190a, 192a, 190b, and 192b may be virtual clients and the migration of clients from network element 104 to network element 160 may be part of a "live migration" of virtual clients. Clients 190a, 192a, 190b, and 192b may be guest operating systems utilizing XEN, Vmware, or other virtualization software and/or hardware. The migration of one or more clients from network element 104 to network element 160 may enable live migration and/or the migration of running processes while reducing the impact of the migration to users of such processes. For example, if clients 190a and 192a are guest operating systems, processes associated with the guest operating systems, such as kernel 130a may be momentarily halted (i.e., "quiesced"). This may enable the migration of kernel 130a and clients 190a and 192a to kernel 130b and clients 190b and 192b, respectively. The migration may be a stateful transition. That is, it may enable the users of the guest operating system to move from network element 104 to network element 160 without loss of state or loss of data.

Migrations by virtual machine monitors and/or hypervisors may enable the movement of data in memory from one platform to another for the clients of the first platform. However, storage management memory structures may not be moved by virtual machine monitors, hypervisors, or other programs. Computing platforms, such as network elements 104 and 160, may utilize shared storage. In some embodiments, computing platforms may utilize shared mirrored storage. As explained previously, mirrored storage management software may utilize one or more memory structures to improve performance. For example, data caching memory structures, dirty region logging, and other memory structures. A migrated environment without these structures in memory may require significant storage input/output, such as disk reads, to rebuild such structures. Until these structures are rebuilt in memory, the performance of a migrated environment may be degraded. Additionally, the rebuilding of such memory structures on a target platform may require processing resources that may further affect the performance of a migrated environment.

In one or more embodiments, a source host, such as, for example, network element 104, may detect migration and may migrate one or more storage management memory structures. The source host may determine one or more units of storage on shared storage 180 which may be associated with an environment to be migrated, such as, for example, client 190a and/or client 192a. The units of storage may be mirrored units of storage, such as, for example, one or more mirrored volumes. In one or more embodiments, the volumes may be exported logical mirrored volumes configured using storage virtualization software (e.g. Volume Manager) exported as logical unit numbers (LUNs) to clients 190a and/or 192a. After determining the units of storage, the source host may determine which memory structures are associated with the units of storage. Dirty region log 110a, cache algorithm list 120a, and/or memory structures 140a may be associated with a mirrored volume utilized by client 190a and/or client 192a. A host platform, such as, for example, network element 104, may retrieve these memory structures after identifying them and may transfer them to network element 160. In one or more embodiments, a source host may transfer storage management memory structures to a target host via a network connection. A target host, such as, for example, network element 160, may receive the storage management memory structures and may utilize them to build its storage management memory. The building of a target host's storage management memory may be significantly improved by utilizing received storage management memory structures and reducing a need to perform storage input/output (I/O) calls.

Other storage management memory structures which may be migrated include maps (e.g., snapshot difference bitmaps). Maps may be utilized, for example, to determine the difference between an original source of data and a replicated source of data. Maps may be maintained in memory to facilitate the synchronization between a first copy of data and a second copy of data. The migration of a storage management memory structure associated with a map may improve performance of a migrated environment.

Improvements to a shared mirrored storage environment are exemplary embodiments of improvements that may be achieved by migrating memory structures associated with storage and/or storage management. Other embodiments may utilize non-mirrored storage, and memory structures associated with such storage may be migrated.

Figure 2:
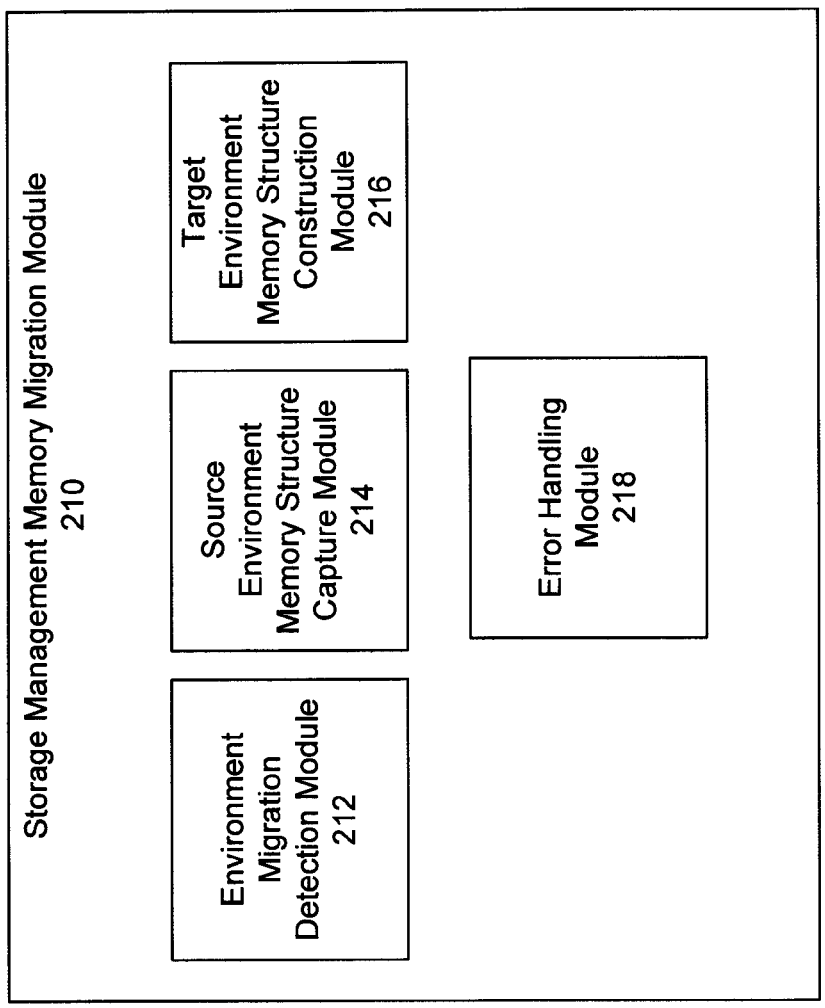
FIG. 2 shows a module for improving performance of a shared storage environment in accordance with an embodiment of the present disclosure.

FIG. 2 shows a module for improving performance of a shared storage environment in accordance with an embodiment of the present disclosure. As illustrated, FIG. 2 depicts a storage management memory migration module 210. Storage management memory migration module 210 may contain one or more components including environment migration detection module 212, source environment memory structure capture module 214, target environment memory structure construction module 216, and error handling module 218.

Environment migration detection module 212 may determine that a migration is about to occur on a source computing platform. It may receive notification from another module or a process, or it may monitor a module or a process.

Source environment memory structure capture module 214 may identify memory structures associated with storage utilized by an environment to be migrated. Source environment memory structure capture module 214 may retrieve the one or more identified memory structures and may transmit them to a target computing platform.

Target environment memory structure construction module 216 may receive one or more memory structures from source environment memory structure capture module 214. Target environment memory structure construction module 216 may utilize the one or more received memory structures to rebuild a portion of the memory of the target computing platform.

Error handling module 218 may handle one or more errors in the migration of a memory structure from a source computing platform to a target computing platform. Error handling module 218 may enable the partial transmission of a memory structure.

For example, if a source computing platform is experiencing errors, a portion of the memory may be corrupted. Error handling module 218 may enable the transmission of the uncorrupted portion of memory to a target computing platform. Error handling module 218 may also enable the retransmission of one or more memory structures from a source computing platform to a target computing platform in the event of a network error or another error.

Figure 3:
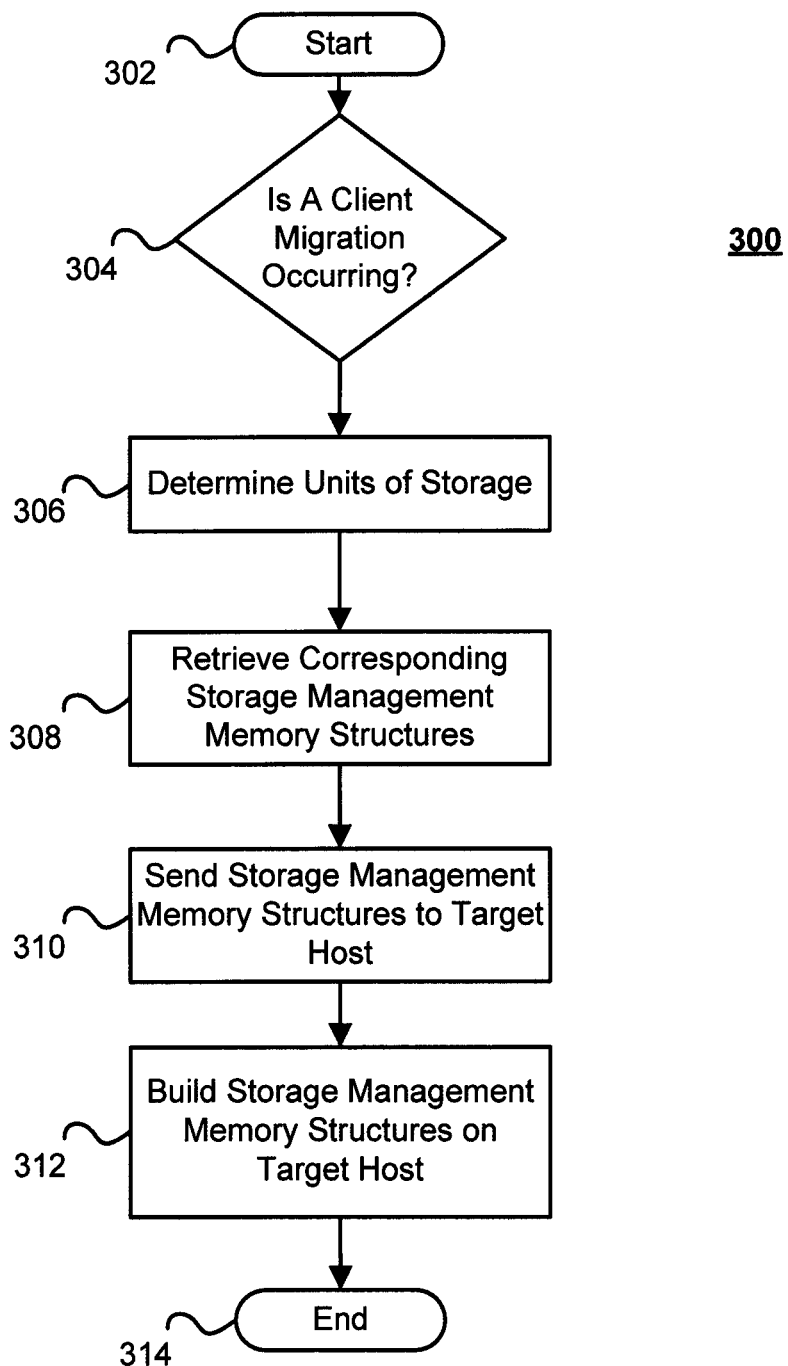
FIG. 3 depicts a method for improving performance of a shared storage environment in accordance with an embodiment of the present disclosure.

FIG. 3 depicts a method 300 for improving performance of a shared storage environment in accordance with an embodiment of the present disclosure. At block 302, the method 300 for improving performance of a shared storage environment may begin. At block 304, the method 300 may detect a client and/or an environment migration, or may be notified of a client migration. In some embodiments, certain conditions such as a utilization level of a source host may indicate that an environment and/or a client may be migrated for load balancing. In some embodiments, detected error conditions may indicate that an environment and/or a client may be migrated. The method 300 may also monitor and/or be notified by a hypervisor, virtualization software, and/or other software or processes.

At block 306, the method 300 may identify one or more units of storage associated with a client and/or an environment to be migrated.

At block 308, the method 300 may identify and retrieve storage management memory structures which correspond to the one or more identified units of storage.

At block 310, the method 300 may send the one or more retrieved storage management memory structures to a target host and/or computing platform.

At block 312, the method 300 may build memory of a target host and/or computing platform utilizing received storage management memory structures of a source host and/or computing platform.

At block 314, the method 300 may end.

At this point it should be noted that improving performance of migrated environments utilizing shared storage in accordance with the present disclosure as described above typically involves the processing of input data and the generation of output data to some extent. This input data processing and output data generation may be implemented in hardware or software. For example, specific electronic components may be employed in a storage management module or similar or related circuitry for implementing the functions associated with migrating memory structures in accordance with the present disclosure as described above. Alternatively, one or more processors operating in accordance with instructions may implement the functions associated with migrating memory structures in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for improving performance of a system using shared storage comprising:
determining a unit of shared storage associated with a computing environment to be migrated from a source computing platform, the unit of shared storage utilized by the source computing platform;
identifying, using at least one computer processor of the system, a storage management memory structure of the source computing platform associated with the unit of shared storage, wherein the storage management memory structure improves performance for the environment to be migrated;
retrieving, using the computer processor, the storage management memory structure of the source computing platform for the unit of the shared storage;
transferring the storage management memory structure to a target computing platform; and
building a portion of storage management memory for the target computing platform utilizing the transferred storage management memory structure, wherein building the portion of storage management memory for the target computing platform improves performance for the environment after migration of the environment to the target computing platform, wherein building the portion of storage management memory reduces a need to rebuild storage management memory on the target computing platform utilizing disk reads, and wherein the transfer of the storage management memory structure and the building of the portion of storage management memory for the target computing platform occur during migration of the computing environment prior to a resumption of one or more environment processes at the target computer platform.

2. The method of claim 1, wherein the environment to be migrated comprises an environment associated with one or more virtual machines.

3. The method of claim 1, wherein the environment to be migrated comprises an environment associated with one or more applications.

4. The method of claim 1, wherein the unit of shared storage comprises a mirrored unit of storage.

5. The method of claim 1, wherein the storage management memory structure includes one or more portions of a dirty region log.

6. The method of claim 1, wherein the storage management memory structure includes data associated with a cache algorithm for improving the dirty region logging memory usage.

7. The method of claim 6, wherein the cache algorithm is a least recently used algorithm.

8. The method of claim 6, wherein the cache algorithm is a least frequently used algorithm.

9. The method of claim 1, wherein the transfer comprises sending the memory structure over a network.

10. At least one non-transitory processor readable storage medium for storing a computer program of instructions configured to be readable by at least one processor for instructing the at least one processor to execute a computer process for performing the method as recited in claim 1.

11. An article of manufacture for improving performance of a system using shared storage, the article of manufacture comprising:
at least one non-transitory processor readable storage medium; and
instructions carried on the at least one non-transitory processor readable storage medium;
wherein the instructions are configured to be readable from the at least one non-transitory processor readable storage medium by at least one processor and thereby cause the at least one processor to operate so as to:
determine a unit of shared storage associated with a computing environment to be migrated from a source computing platform, the unit of shared storage utilized by the source computing platform;
identify a storage management memory structure of the source computing platform associated with the unit of shared storage, wherein the storage management memory structure improves performance for the environment on the source computing platform;
retrieve the storage management memory structure of the source computing platform for the unit of the shared storage;
transfer the storage management memory structure to a target computing platform; and
build a portion of storage management memory for the target computing platform utilizing the transferred storage management memory structure, wherein building the portion of storage management memory for the target computing platform improves performance for the environment after migration of the environment to the target computing platform, wherein building the portion of storage management memory reduces a need to rebuild storage management memory on the target computing platform utilizing disk reads, and wherein the transfer of the storage management memory structure and the building of the portion of storage management memory for the target computing platform occur during migration of the computing environment prior to a resumption of one or more environment processes at the target computer platform.

12. A system for improving performance of a shared storage environment, comprising:
one or more processors communicatively coupled to a network; wherein the one or more processors are configured to:
determine a unit of shared storage associated with a computing environment to be migrated from a source computing platform, the unit of shared storage utilized by the source computing platform;
identify a storage management memory structure of the source computing platform associated with the unit of shared storage, wherein the storage management memory structure improves performance for the environment on the source computing platform;
retrieve the storage management memory structure of the source computing platform for the unit of the shared storage;
transfer the storage management memory structure to a target computing platform; and
build a portion of storage management memory for the target computing platform utilizing the transferred storage management memory structure, wherein building the portion of storage management memory for the target computing platform improves performance for the environment after migration of the environment to the target computing platform, wherein building the portion of storage management memory reduces a need to rebuild storage management memory on the target computing platform utilizing disk reads, and wherein the transfer of the storage management memory structure and the building of the portion of storage management memory for the target computing platform occur during migration of the computing environment prior to a resumption of one or more environment processes at the target computer platform.

13. The system of claim 12, wherein the environment to be migrated comprises an environment associated with one or more virtual machines.

14. The system of claim 12, wherein the environment to be migrated comprises an environment associated with one or more applications.

15. The system of claim 12, wherein the unit of shared storage comprises a mirrored volume.

16. The system of claim 12, wherein the storage management memory structure includes one or more portions of a dirty region log.

17. The system of claim 12, wherein the storage management memory structure includes data associated with a cache algorithm for improving the dirty region logging memory usage.

18. The system of claim 12, wherein the cache algorithm is a least recently used algorithm.

* * * * *